United States Patent [19]
Brown

[11] 3,985,051
[45] Oct. 12, 1976

[54] APPARATUS FOR CUTTING AND GROOVING A PIPE

[75] Inventor: Charles Kepler Brown, Richmond, Va.

[73] Assignee: Teledyne Mid-America Corporation, Richmond, Va.

[22] Filed: Nov. 19, 1975

[21] Appl. No.: 633,295

Related U.S. Application Data
[63] Continuation of Ser. No. 431,053, Jan. 7, 1974, abandoned.

[52] U.S. Cl. .................................. 82/101; 29/104; 90/11 A
[51] Int. Cl.² .......................................... B22B 3/04
[58] Field of Search............. 82/101, 100, 102, 4 C; 29/104; 90/11 C, 11 A

[56] References Cited
UNITED STATES PATENTS

| | | | |
|---|---|---|---|
| 1,237,677 | 8/1917 | Murphy | 82/4 C X |
| 1,256,556 | 2/1918 | Hedges | 82/4 C |
| 2,842,238 | 7/1958 | Shaw et al. | 90/12 R |
| 3,107,564 | 10/1963 | Coker et al. | 82/101 |
| 3,541,905 | 11/1970 | May | 82/101 X |
| 3,572,199 | 3/1971 | Harden | 82/101 |
| 3,579,826 | 5/1971 | Morain | 82/4 C |
| 3,699,828 | 10/1972 | Piatek | 82/4 C |
| 3,820,424 | 6/1974 | George, Jr. | 82/101 |
| 3,839,941 | 10/1974 | Adams | 90/12 R |

FOREIGN PATENTS OR APPLICATIONS

| | | | |
|---|---|---|---|
| 21,884 | 10/1911 | United Kingdom | 29/104 |

*Primary Examiner*—Othell M. Simpson
*Assistant Examiner*—W. R. Briggs
*Attorney, Agent, or Firm*—Strauch, Nolan, Neale, Nies & Kurz

[57] ABSTRACT

A portable frame supports a mechanism for cutting pipes of various sizes. The pipe can also be grooved or bevelled at the same time. Initially a cutter cuts through a portion of a held, non-rotating pipe. Thereafter the pipe is rotated, or rolled, about its axic to permit the cutter to pass through the remaining portion of the cross section of the pipe to be cut. A single revolution of the pipe accomplishes the cutting thereof. Grooving or bevelling tools can be used simultaneously with the cutter to effect the grooving or bevelling of the pipe.

2 Claims, 8 Drawing Figures

APPARATUS FOR CUTTING AND GROOVING A PIPE

This is a continuation of application Ser. No. 431,053, filed Jan. 7, 1974, now abandoned.

This invention relates to methods and apparatus for milling and element and, more particularly, pertains to methods and apparatus for cutting into a non-rotating pipe and then rotating the pipe to cut the pipe into sections. Bevelling or grooving can be accomplished simultaneously.

Generally, when it is desired to cut pipes of intermediate size, for example, 6 inches to 24 inches in diameter, each pipe is mounted in and gripped by a chuck of a lathe and rotated while a non-rotating tool fit is moved laterally into the rotating chucked pipe. The cutting is accomplished in several successive turns of the pipe as the tool bit is moved gradually into the rotating pipe. The lathe requires a heavy bed which is fixed and contained in a permanent location such as a shop. Additionally the tool bit requires rigid holding supports which are movable. Heavy duty power equipment is also required to operate the various components of the pipe cutting facilities.

The lack of portable equipment for this purpose requires that all pipe be precut before transporting to the installation location. In many instances, the precise lengths of pipe needed for a particular installation are not known until the pipe is being installed on a section-by-section basis. When the lathe system is used, frequent trips to the shop are necessitated to cut the pipe into the required lengths.

When the lathe is used, the pipe must be moved axially into the chuck before being clamped therein. This procedure requires sufficient space extending from the chuck to permit maneuverability of the pipe prior to insertion into the chuck.

All of the above necessities naturally result in cumbersome and costly procedures and equipment. Thus there is a need for a portable facility which is capable of handling various sizes of pipe for cutting the pipe into selected lengths and also for bevelling and grooving the cut pipe. Further, there is a need for a pipe cutting facility which is simple in technique of operation while performing the cutting procedure in a fast and efficient manner. Additionally, such a pipe cutting facility should permit lateral movement of the pipe into the facility prior to gripping to eliminate a need for additional space normally required in axial movement of the pipe into a pipe cutting facility.

It is therefore, an object of this invention to provide methods and apparatus for cutting pipe into sections.

Another object of this invention is to provide methods and apparatus for cutting pipe into sections and simultaneously bevelling or grooving the pipe.

Still another object of this invention is to provide methods and apparatus for cutting pipe into sections at the site where the pipe is to be installed in a pipe or conduit system.

A further object of this invention is to provide methods and apparatus for cutting pipe into sections in a relatively inexpensive, simple and efficient manner.

A still further object of this invention is to provide methods and apparatus for cutting pipe where the pipe is placed into the apparatus by lateral movement of the pipe.

Another object of this invention is to provide methods and apparatus for cutting pipe into sections by cutting through a portion of the pipe wall and rotating the pipe while cutting the remaining portion of the pipe wall.

Still another object of this invention is to provide apparatus for cutting pipe into sections wherein the apparatus is capable of receiving pipe of various diameters by simple and efficient adjustment of the apparatus.

Other objects and attendant advantages of this invention will become more readily apparent and understood from the following detailed specification and accompanying drawings in which.

Figure 5:
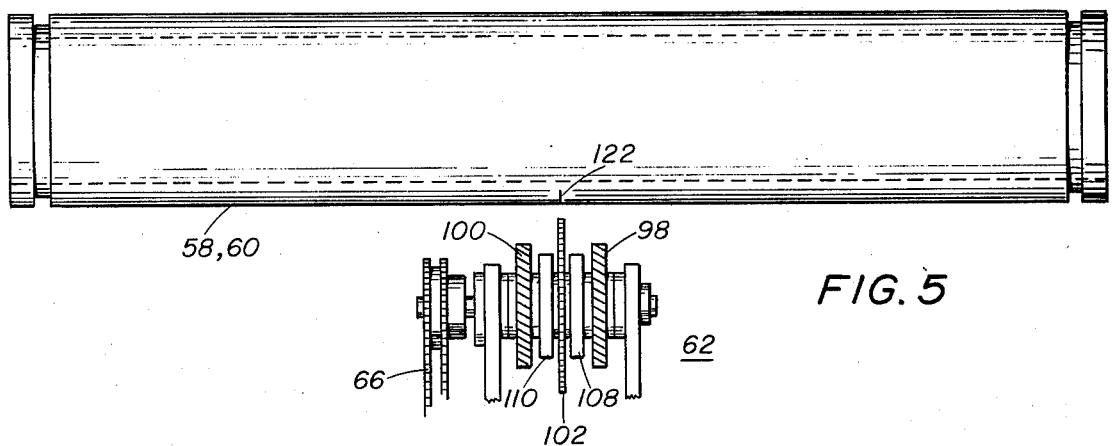
Figure 6:
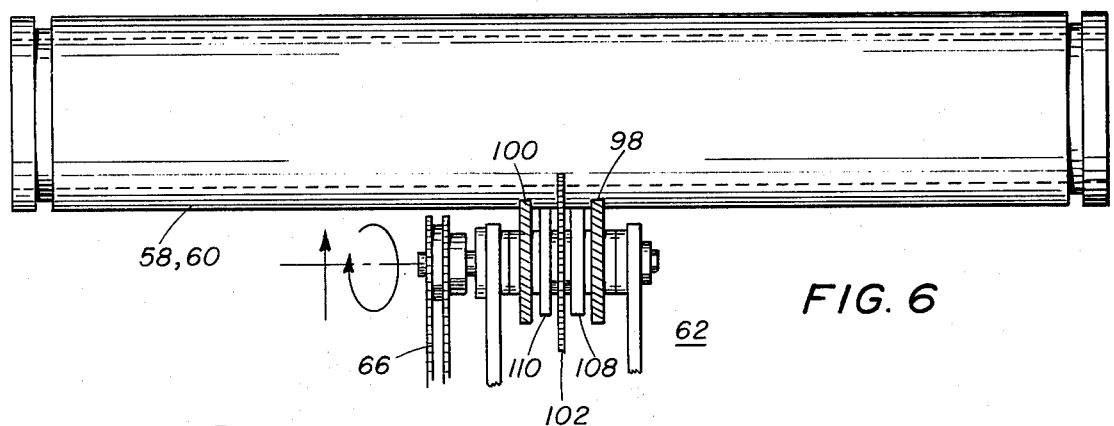
Figure 7:
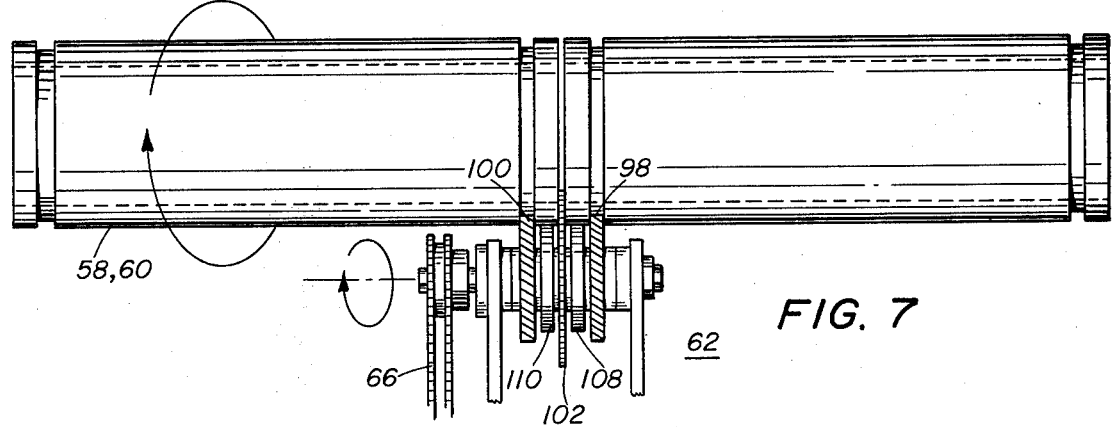
Figure 8:
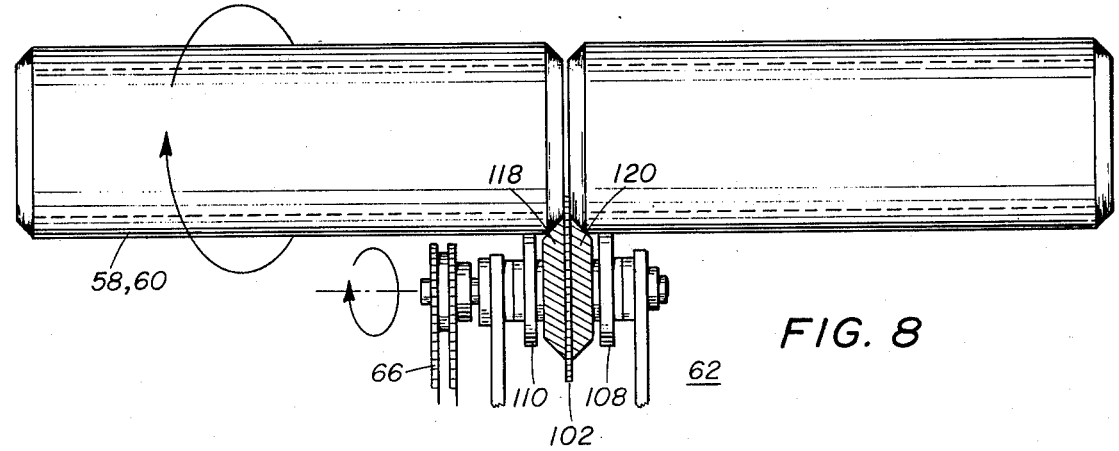

FIGS. 5, 6, and 7 are partial plan views of a pipe and the cutting and grooving blades at various stages in a cutting and grooving operation; and FIG. 8 is a partial plan view of a pipe and cutting and bevelling blades at the completion of a cutting and bevelling operation.

Referring to FIGS. 1 through 4, a pipe cutting apparatus 10 includes a frame 12 mounted on rollers 14, 16, 18 and 20 at the four lower corners thereof. Four jack screws 22, 24, 26 and 28 are mounted on side portions of the four corners of the frame 12 and are adjustable to firmly mount the frame on a base such as the floor. This places the weight of the apparatus 12 solidly on the floor and can displace the rollers 14, 16, 18 and 20 from engagement with the floor so that the apparatus is seated against movement.

Idle clamping rollers 30 and 32 are mounted spacedly on a fixed portion of the frame 12. Driven rollers 34 and 36 are mounted spacedly on a portion of an adjustable carriage 38 which is adjustably movable toward and away from the portion of the frame which supports the idle clamping rollers 30 and 32.

A power driving system is mounted on the adjustable carriage 38 and includes an electrical motor 40, chain drive 42, right angle reducer 44 and chain drive 46. A sprocket 48 is mounted on a rotatable shaft 50 and has the chain drive 46 positioned thereover. The shaft 50 is mounted at opposite ends thereof to bearing plates 52 and 54 and has a chain drive 56 coupled to one end thereof. The chain drive 56 is also coupled to driven rollers 34 and 36. Thus when the motor 40 is operated the rollers 34 and 36 are driven through the power driving system.

Figure 1:
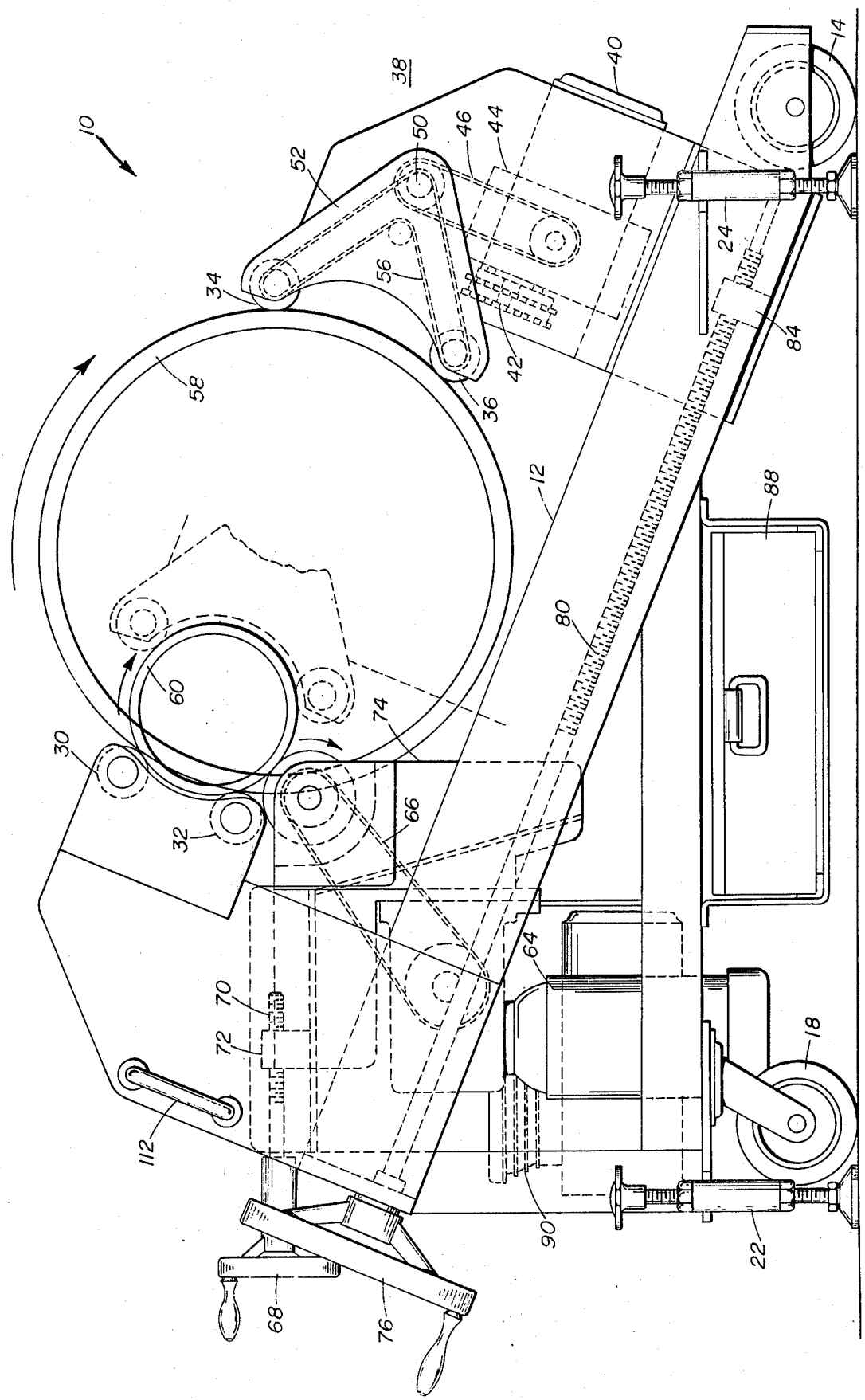
FIG. 1 is a side view of a pipe cutting apparatus embodying certain principles of the invention.

As viewed in FIG. 1, pipes of various diameters, for example any pipe which ranges in size from pipe 58 to pipe 60, may be inserted between idler rollers 30 and 32, and driven rollers 34 and 36. While the specific illustrated embodiment has been designed to receive and cut pipe ranging from 6 to 24 inches in diameter, other apparatus having the same conceptual features can be designed to handle and cut pipe of virtually any diameter and still enjoy the many advantages of the illustrated apparatus 10.

In order to effect a cutting and machining of pipe, the apparatus 10 includes a rotatable milling cutter assembly 62 more clearly illustrated in FIGS. 2 and 5, 6 and 7. A power system for operating the cutter assembly 62 includes a gear motor 64 and sprocket and chain drive 66. A hand wheel 68 controls screw 70 which passes through nut 72 which is secured to the frame 12 for movement relative thereto. The nut 72 forms a rearward portion of a milling head assembly 74 which supports the cutter assembly 62. By rotating the hand wheel 68, the cutter assembly is controllably moved into cutting engagement with the pipe 58, or 60, and away from the pipe when such retracting movement is desired.

Figure 2:
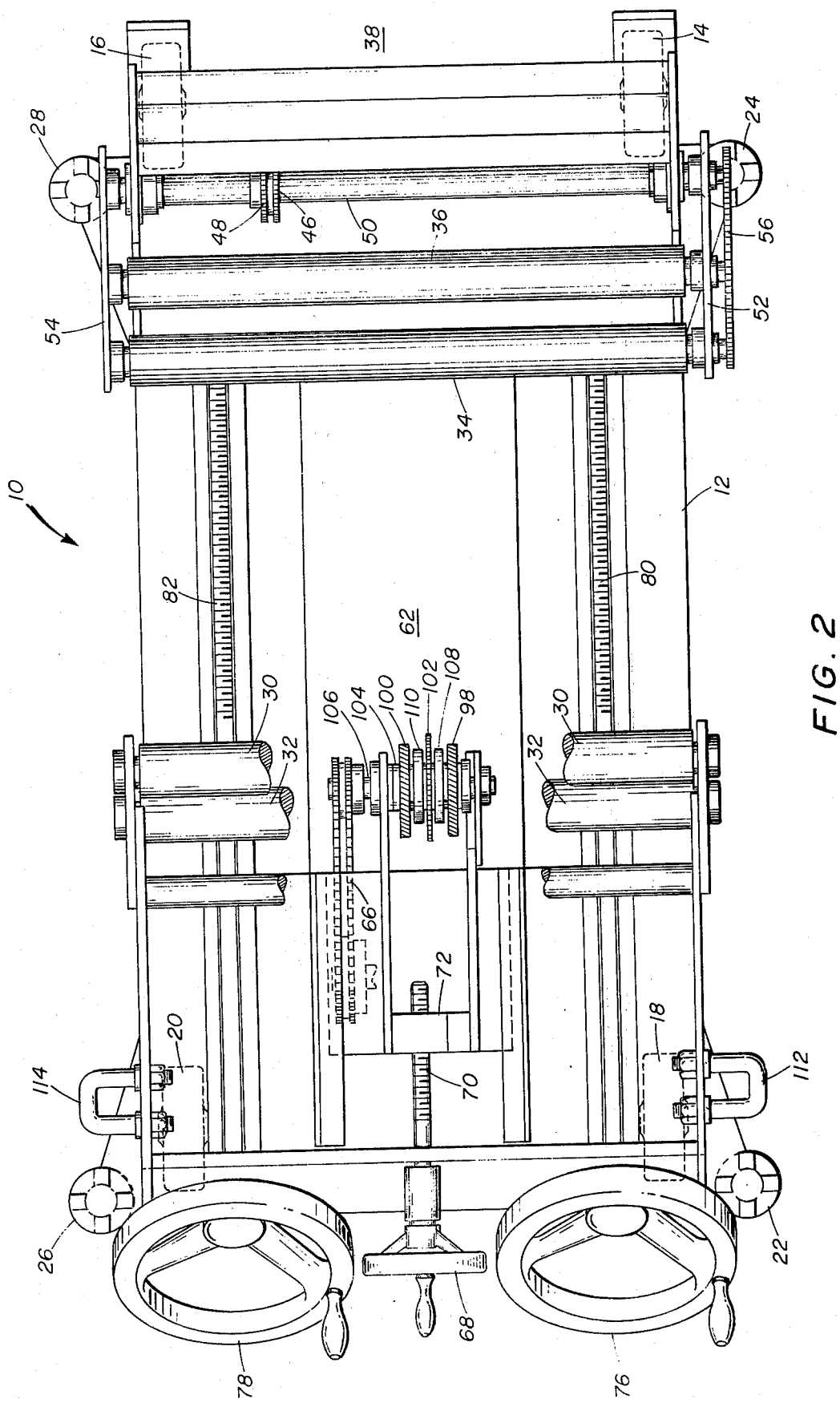
FIG. 2 is a plan view of the pipe cutting apparatus of FIG. 1 with portions removed to show a cutting blade and two grooving blades.
Figure 3:
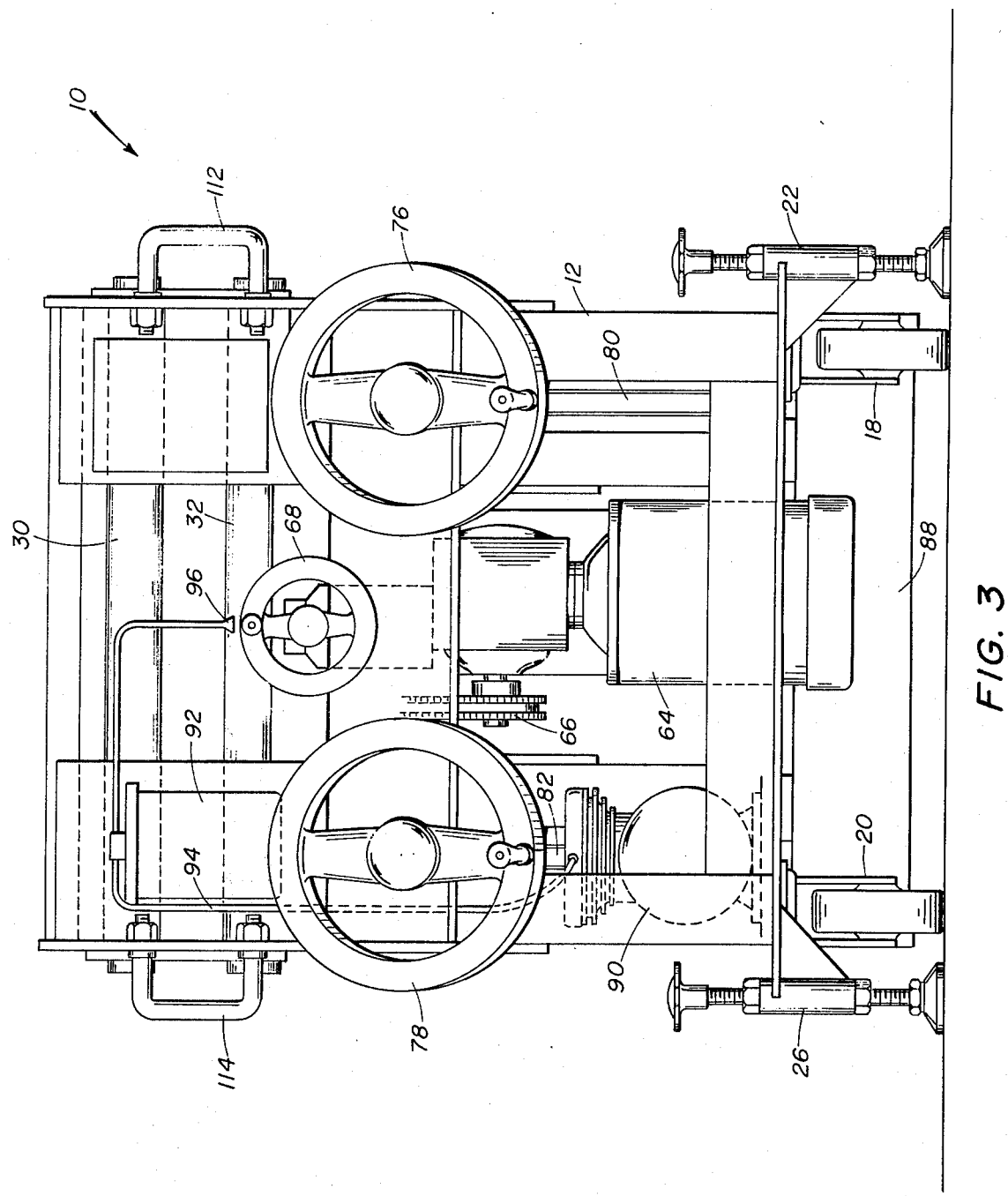
FIG. 3 is an end view of the left end of the cutting apparatus of FIG. 1.

As more precisely shown in FIGS. 2 and 3, a pair of hand wheels 76 and 78 are attached to and facilitate the rotation of parallel drive screws 80 and 82, respectively, the opposite ends of which pass through nuts 84 (FIG. 1). The nuts 84 are secured to the adjustable carriage 38 which is adjustably morable by the hand wheels 76 and 78 and screws 80 and 82. This permits the positioning of the driven rollers 34 and 36 into tight frictional engagement with the pipe 58, or 60, prior to operation of the motor 40 and a cutting operation.

To further facilitate the operation of apparatus 10, the rollers 30, 32, 34 and 36 could be knurled to enhance the gripping and driving requirements of the rollers. Additionally, the rollers 30 and 32 could also be power driven to increase the pipe rotational torque against the engagement of the pipe with the cutter assembly 62.

Chip pan 88 is located at the center bottom of the frame 12 to collect chips resulting from the cutting, bevelling and grooving operations.

As shown in FIG. 3, a portable air compressor 90 furnishes air to a spray mist unit 92 through a conduit 94. An air and coolant mist is then dispensed from a nozzle 96 and is directed onto and cools and lubricates the cutter assembly 62 and portion of the pipe 58, or 60, being cut.

Referring to FIGS. 2, 5, 6 and 7, the cutter assembly 62 includes rotatable grooving blades 98 and 100 spaced on opposite sides of a cutting blade 102. The blades 98, 100 and 102 are mounted on a hollow shaft 104 which is positioned on a drive shaft 106. A pair of depth control rollers 108 and 110 are also mounted on the hollow shaft 104 on opposite sides of the cutting blade 102. The rollers 108 and 110 limit the inward travel of the assembly 62 to establish the depth of the grooves formed in the pipe 58, or 60, by the grooving blades 98 and 100. The drive shaft 106 is coupled to the chain drive 66 of the power driving system so that the cutter blade 102 and the grooving blades 98 and 100 are rotated when the gear motor 64 is operated.

The blades 98, 100 and 102 and the rollers 108 and 110 can be assembled on the hollows shaft 104 as a preassembled package in various predetermined sizes to facilitate the numerous cutting and grooving requirements for various sizes of pipe.

As illustrated in FIG. 8, bevel cutting blades 118 and 120 are mounted on opposite sides of the cutting blade 102 and are used to facilitate the forming of bevelled edges on the simultaneously cut sections of pipe. The assembly of the blades 118 and 120 can also be mounted with the other elements of the assembly 62 as a prepackaged unit. Again, this facilitates the quick and efficiently simple exchange of blade size to accommodate the cutting and bevelling of different sizes of pipe.

Handles 112 and 114 are secured to the frame 12 to facilitate easy handling and maneuverability of the apparatus 10 prior to and after a cutting operation.

In operation, a scribe line 122 (FIG. 5) is made on the pipe 58, or 60, where the pipe is to be cut into two sections. Assuming that the pipe 58 is to be also grooved, the cutter assembly 62 having the grooving blades 98 and 100 and the cutter blade 102, to cut and groove the particular size of pipe, is assembled on the drive shaft 106.

Figure 4:
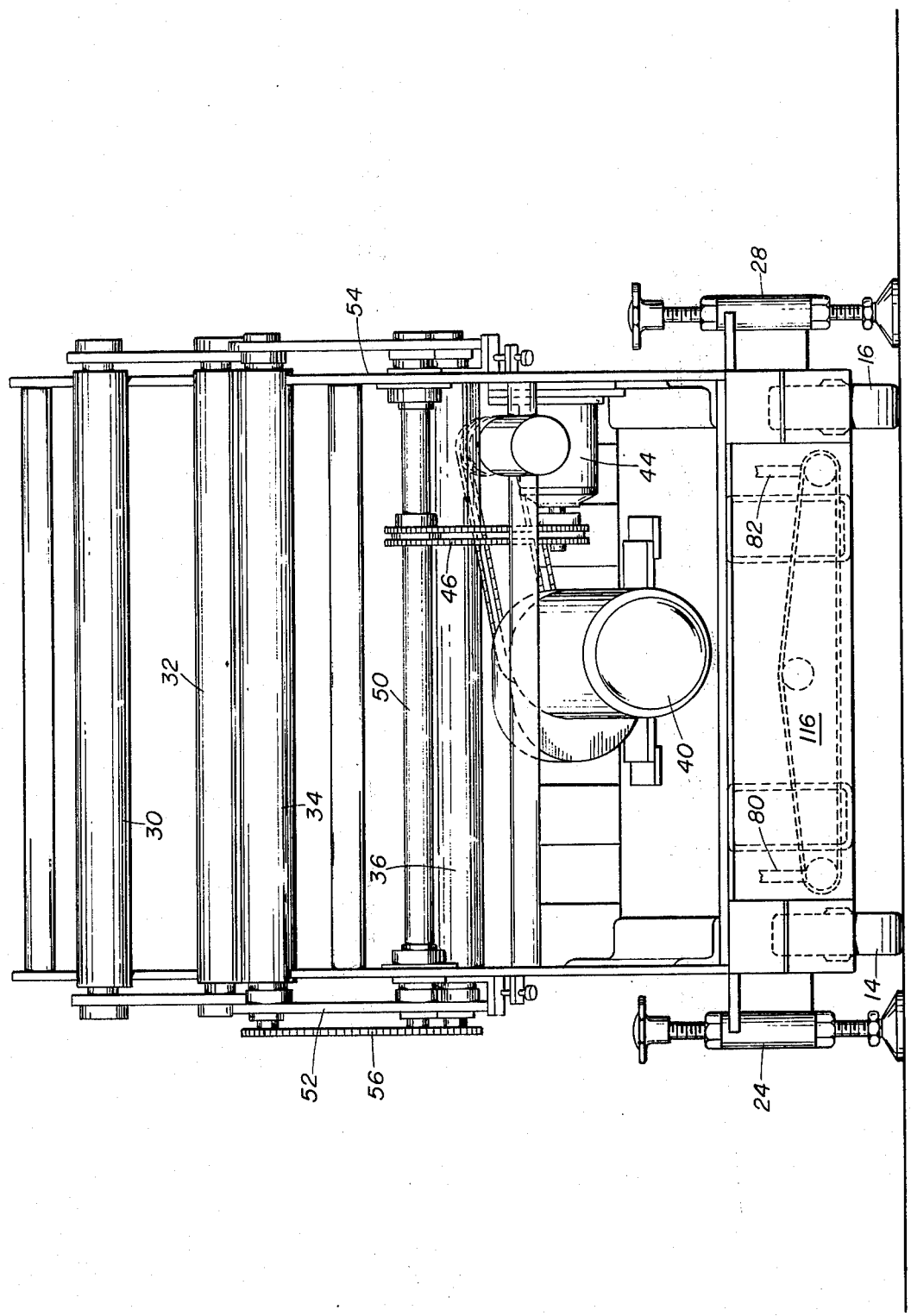
FIG. 4 is an end view of the right end of the cutting apparatus of FIG. 1.

The pipe 58 is then inserted laterally into the space between the opposed and spaced pairs of rollers 30, 32 and 34, 36 and the scribe line 122 is aligned with the cutter blade 102 as shown in FIG. 5. The hand wheels 76 and 78 are rotated to move the adjustable carriage 38 toward the inserted pipe 58 until the pipe is firmly clamped between the spaced pairs of rollers 30, 32 and 34, 36. As shown in FIG. 4, a roller chain and sprocket system 116 synchronizes the rotating movement of screws 80 and 82 to facilitate the smooth movement of the adjustable carriage 38.

The gear motor 64 is operated to rotate the drive shaft 106 and thereby rotate the grooving blades 98 and 100 and cutter blade 102. The hand wheel 68 is then rotated to move the cutter assembly 62 toward the clamped pipe 58 and ultimately into and through the wall of the engaged section of the pipe as shown in FIG. 6. Simultaneously, the grooving blades 98 and 100 cut into the engaged section of the pipe 58 also as shown in FIG. 6. As further illustrated in FIG. 6, only the cutter assembly 62 is rotating at this time. It is noted that the depth control rollers 108 and 110 have engaged the pipe 58 and preclude further movement of the assembly 62 further into the pipe. At this time, the cutter blade 102 has cut desirably and completely through the wall of the pipe 58 and the grooving blades 98 and 100 have formed the grooves in the pipe to the desired depth. This arrangement insures a uniformly deep groove even though the pipe 58 may not be perfectly round.

Thereafter, the motor 40 is operated to drive the rollers 34 and 36. Since the pipe 58 is clamped between the pairs of rollers 30, 32 and 34, 36, the frictional engagement between the pipe and the rollers 34 and 36 results in the pipe being rotated about its axis. This rotation is illustrated in FIG. 7. During rotating of the pipe 58, the cutter assembly 62 continues to be rotated so that the cutter blade 102 cuts the pipe completely in a plane coincident with the scribed line 122 (FIG. 5) to thereby cut the pipe into two sections. Simultaneously, the grooving blades 98 and 100 form the circumferential grooves in the pipe 58 as shown in FIG. 7. It is noted that the freely rotatable depth control rollers 108 and 110 continue to preclude further movement of cutter assembly 62 toward the axis of the pipe 58.

The pipe 58 need be rotated through only one revolution to effect the completion of the cutting operation and the forming of the grooves. This is in comparison to the many revolutions required in the lathe and other facilities.

The grooved pipe 58 can then be assembled in a conduit system with other grooved pipe by using self sealing fittings which are clamped into and extend between the grooves of adjacent sections of pipe to be joined.

When the bevel-end pipe is formed, this type of pipe is joined with other bevel-end pipe by butting the two bevelled ends and filling the bevelled areas with a weld.

The operation of the apparatus 10 for the bevel-end cut is identical to the procedure for the groove and cut operation and need not be repeated. Again the rollers 108 and 110 control the depth to which the bevel cutting blades 118 and 120 are permitted to procede.

Thus the apparatus 10 has a gripping facility which includes round jaws, such as rollers 34 and 36, conforming essentially to the round shape of the pipe 58, or 60, to rotatably feed successive portions of the pipe into a rotating mill cutter and grooving or bevelling assembly. Of course, the apparatus 10 could be used just for effecting any one of the cutting, grooving or bevelling operations without effecting any one or more of the other two and still be within the spirit and scope of this invention.

The portability of the apparatus 10 permits the transporting of the apparatus to the sight of pipe assembly into a conduit system where frequent cutting of pipe is necessary. Further, the arrangement of the pipe clamping and rotating facilities permit the lateral loading of the pipe as opposed to axial loading when using the heavy-bedded lathe.

Obviously many modifications and variations of the present invention are possible in light of the above teachings. It is, therefore, to be understood that within the scope of the appended claims the invention may be practiced otherwise than as specifically described.

I claim:

1. Apparatus for cutting a pipe into two separate lengths and for simultaneously forming annular grooves of controlled depth in the opposite ends of the lengths into which the pipe is cut, said apparatus comprising: means supporting a pipe to be cut for rotation about its longitudinal axis; a tool assembly comprising a shaft rotatable about axes parallel to said longitudinal axis, a cutter blade fixed to said shaft for rotation therewith, grooving blades smaller in diameter than said cutter blade fixed to said shaft for rotation therewith, said grooving blades being on opposite sides of and in spaced relation to said cutter blade, and depth control rollers smaller in diameter than said grooving blades mounted on the shaft on opposite sides of the cutter blade and between said cutter blade and said grooving blades for controlling the depths of the grooves cut by said grooving blades; means for rotating said tool assembly shaft; means for then moving the tool assembly toward said pipe supporting means to engage said depth control rollers with the outer surface of a pipe held therein and thereby bring the cutters and grooving blades into cutting and grooving coaction with said pipe; and means for thereafter rotating the pipe about its longitudinal axis to extend the cut and the annular grooves around the circumference of the pipe, whereby said pipe can be cut in two and said grooves formed in a single pass of the tool assembly around the circumference of the pipe.

2. Apparatus as defined in claim 1 together with a support means for the tool assembly shaft adjacent and on the outboard side of each of said grooving cutters.

* * * * *